June 18, 1957 G. A. MARSH ET AL 2,796,583
AUTOMATIC CORROSION RATE METER
Filed Dec. 28, 1953 2 Sheets-Sheet 1

FIG. I

INVENTOR.
GLENN A. MARSH
LYNN E. ELLISON
BY
ATTORNEY

INVENTOR.
GLENN A. MARSH
LYNN E. ELLISON
BY
ATTORNEY

United States Patent Office 2,796,583
Patented June 18, 1957

2,796,583

AUTOMATIC CORROSION RATE METER

Glenn A. Marsh and Lynn E. Ellison, Crystal Lake, Ill., assignors to The Pure Oil Company, Chicago, Ill., a corporation of Ohio Application December 28, 1953, Serial No. 400,743

8 Claims. (Cl. 324—30)

This invention relates to an apparatus which automatically and rapidly determines corrosion rate.

Corrosion is a consistent industrial problem which annually costs the industries large sums of money. The problem is constantly under surveilance. However, solutions to separate corrosion problems are made difficult because vaticination cannot be used due to the empirical nature of the corrosion problem. Generally, the determination of the susceptibility of metallic materials of construction to corrosion has required exposure of the metal being considered to the various environments to which the metal would be subjected under controlled laboratory conditions to supply information which could be used to evaluate how the material would react under service conditions. This entails a considerable amount of time because the passage of weeks and even months was necessary in order to make a competent appraisal of the corrosion resistance of the metal being studied. In spite of considerable time being spent, even this method was unsatisfactory because unexpected small variations in the characteristics of the service environment frequently were sufficient to upset the calculations of the design engineer. It became quite evident that an instrument which would permit not only the study of corrosion under controlled laboratory conditions but also under service conditions was especially desirable. In searching for time-saving techniques, investigators have taken advantage of the electrochemical nature of the corrosion mechanism. The polarization phenomenon has been the electrochemical mechanism upon which investigators have dwelled in an effort to find a satisfactory rapid technique which may be used in corrosion studies. A number of techniques using this phenomenon have been disclosed in the prior art. Most methods, however, are not generally applicable because they are based upon considerations which are not common to all corrosion systems. However, it has been found that a correlation exists between the corrosion rate of a system, and the time and variations in potentials produced during the anodic and cathodic polarization-depolarization cycle artificially induced in a pair of electrodes immersed in an electrolytic environment, suspected of producing corrosion, by passing an instantaneous discharge of direct current from an external source through a circuit containing the two electrodes. Marsh, in U. S. patent application Serial No. 350,150, filed April 21, 1953, now Patent No. 2,786,021, discloses and claims a method and apparatus which employs this correlation. Continued study of this technique has resulted in an improved apparatus which further facilitates the rapid study of corrosion rate.

Accordingly, it is an object of this invention to provide a wholly automatic apparatus which permits the rapid and direct determination of the corrosion rate of a metallic material of construction. It is a further object of this invention to provide a device which automatically interprets polarization phenomenon induced in a pair of electrodes immersed in a corrodent and makes visibly manifest the corrosion rate in terms of conventional units which may be directly read from a suitable metering instrument. It is another object of this invention to provide an instrument which may be employed to rapidly and directly determine the corrosion rate of metallic materials of construction either under controlled laboratory conditions or under actual corrosion conditions occurring in the field. These and other objects will become more apparent from the following detailed discussion of the instant invention.

Figure 1 is a block diagram representation of the component elements of the apparatus integrated into a unitary device for rapidly determining corrosion rate.

Figure 2:
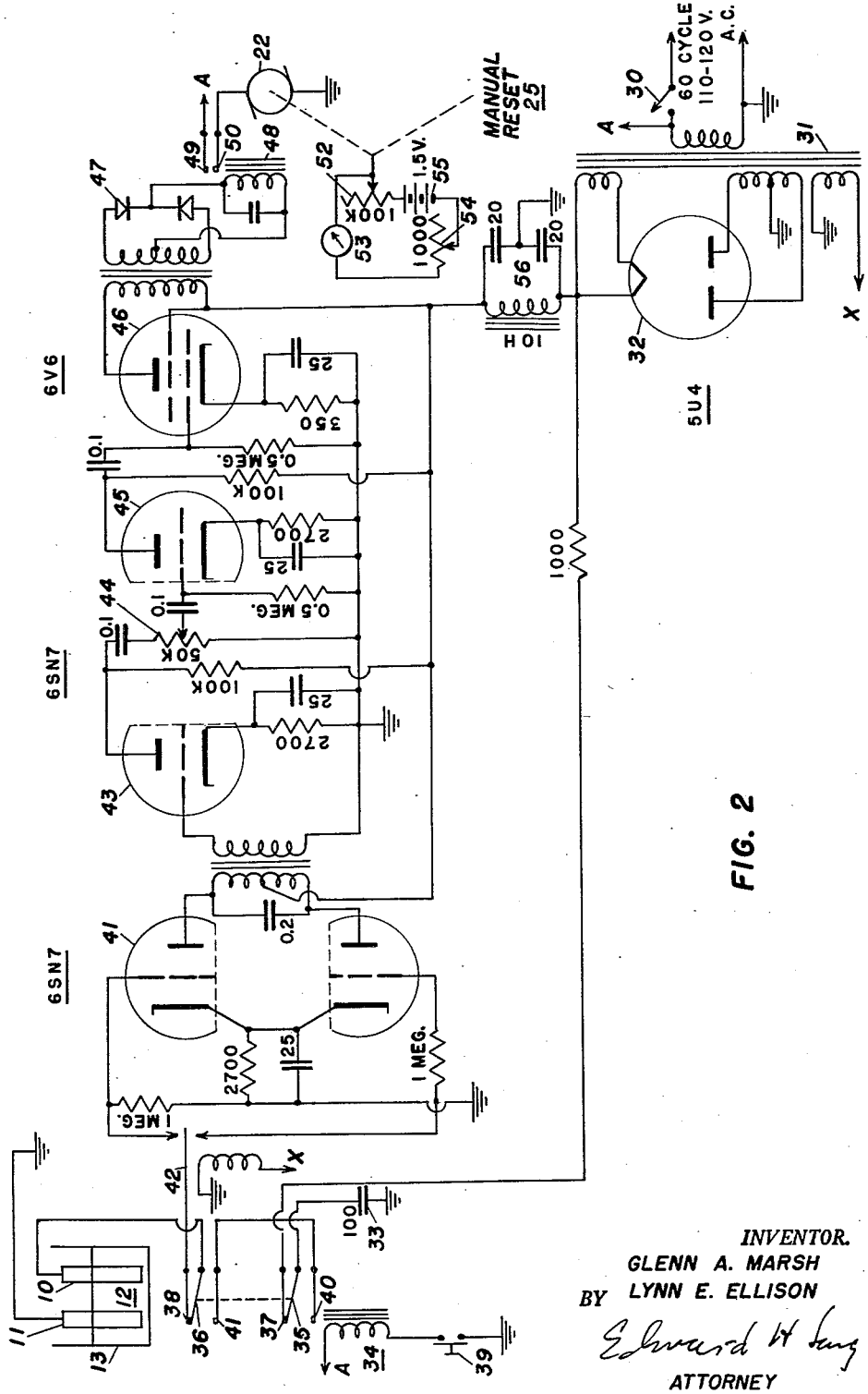
Figure 2 is a circuit diagram showing schematically the relation of several specifically described units employed in an embodiment of this invention.

When current is passed through an electrode immersed in an aqueous solution, irreversible processes occur at the electrode surface. These processes result in the building up of layers of charged or uncharged particles on the electrode surface, which in turn alter the electrode potential relative to the solution. The products formed at the electrode surface are called polarization products and the change in electrode potential is called polarization. Similarly, when the current through an electrode is interrupted, the polarization products began to diffuse away or react in some other way with the result that the electrode potential is again changed in the direction of an unpolarized electrode. A plot of electrode potential v. time during and after the passage of current reveals polarization and depolarization curves which are characteristic of the corroding medium.

It has been found that by employing two metallic electrodes and plotting the depolarization voltage of one v. the other, the resulting curves would be interpreted in terms of corrosion rates. Although a number of possible criterions which are related to the slope of the respective curves can be employed as the basis of the correlation, it is preferred that the corrosion rate be related to the time required to depolarize to a certain fraction of the maximum recorded polarization. It was further found that this time factor was inversely proportional to the log of the corrosion rate. In this work, the time factor two-thirds was chosen because it gave the best empirical correlation with actual corrosion data.

In the instant invention the same phenomenon is employed; however, a more elaborate mechanism has been invented which automatically and rapidly interprets and correlates the phenomenon. In employing this invention, two metallic electrodes are immersed in the corrodent. An instantaneous discharge of direct current is passed between them and, immediately following this discharge the potential difference existing between the electrodes is applied to an electronic device. This device operates a timing motor which starts functioning just after the instantaneous discharge and it shuts off after the potential between the two electrodes decreases to a predetermined fraction, for example, two-thirds, of the initial or triggering potential induced by the instantaneous discharge of current. The motor drives a variable resistance through a suitable gear train. The variable resistance is in series with a source of D. C. potential, such as a battery, a milliammeter, and a calibrating resistance. Thus the motor translates the variable, time, into a dependent variable, namely, current, on the milliammeter. By choosing the values it is possible to get the log of milliammeter current to be inversely proportional to time, and thus the meter scale can be directly calibrated in linear units of corrosion rates such as mils penetration per year. Thus is provided an instrument which is an automatic direct reading corrosion rate meter.

The various phases of the operating cycle can best be understood by referring to Figure 1. In this block diagram, an outline of the plurality of functions which are necessary in the operation of direct reading corrosion rate meter is given. Initially, an instantaneous discharge of a predetermined amount of current is passed through two test electrodes 10 and 11 immersed in the solution 12 which is contained in a suitable receptacle 13. This receptacle 13 may be simply a glass beaker where corrosion rate is being studied under controlled laboratory conditions, or may be a conduit or vessel forming a part of a process which contains a corrosive environment. The predetermined amount of current is passed through electrodes 10 and 11 by closing a suitable switch or discharge button 14, which permits the flow of current from a polarizing current source 15. The switch arrangement 16 provides for the transfer of the polarization potential to the detecting network of the apparatus. In the detecting network, which includes a converter 17 for converting the D. C. polarization potential to alternating current, a two-stage amplifier 18 and 19 is provided, which amplifies the A. C. signal received from converter 17. This amplified signal is applied to and controls power amplifier 20. These several units make up the detecting network of the apparatus which, in effect, is a sensing circuit which "remembers" the initial potential existing between the electrodes after the instantaneous discharge of current has passed between them. The detecting network operates, by means of relay 21, a timing motor 22, and turns off the timing motor when the potential between the two electrodes drops to the above mentioned prescribed fraction of the initial potential as "remembered" by the detecting network. The timing motor 22 operates an electrical mechanism 23 which converts the log of time into linear units on meter 24, which under proper operation and calibration are units of corrosion rate. After the cycle has been completed and the rate of corrosion metered, manual reset 25 is provided which permits the electrical mechanism 23 to be repositioned for another determination.

A specific embodiment of the instant invention is shown in Figure 2. In this figure, although the values of the various circuit elements are given, this embodiment is only intended to be an illustrative and non-limiting example of the subject invention. To operate the apparatus of this invention, electrodes 10 and 11 are immersed in an electrolyte contained in a suitable receptacle 13. The electrodes 10 and 11 are prepared from the material which is being studied. These electrodes are substantially identical. In practice, it has been found that small diameter rods are preferred although small rectangular coupons are also suitable. In the specific embodiment shown in Figure 2, ¼" diameter steel rods 6" long were employed. These rods were sheathed in an insulating tubing such as Tygon, a corrosion-resisting tubing marketed by the U. S. Stoneware Company, to expose only 1½". The sheathed rods were mounted side by side in a receptacle containing a corrosive electrolyte. This technique can be employed where corrosive rate is being studied under laboratory conditions. When the instrument is being employed to determine corrosion rate in the field, the electrodes are permanently installed in any vessel, tower, column, conduit or the like which may be exposed to conditions of corrosion.

Switch 30 is closed. This permits current to flow in transformer 31. Generally, a 60-cycle, 110–120 volt A. C. source of current is employed when conveniently obtainable. The alternating characteristics of the current are rectified in full wave rectifier 32 to produce direct current. A portion of this direct current is used to charge condenser 33 through relay 34 which, in the preferred embodiment, is a double pole, double throw relay having a normally closed position. The so-called normal position is assumed by the contacts when the operating mechanism of the relay is de-energized. In this normal position, contacts 35 and 36 of relay 34 engage poles 37 and 38. When relay 34 is energized by closing switch 39, contacts 35 and 36 are pulled in and connect with poles 40 and 41. This causes condenser 33 to discharge instantaneously across electrodes 10 and 11, and induce their polarization. In carrying out the instant invention, the discharge of condenser 33, or other suitable source of polarizing current, should produce a current of sufficient magnitude to produce measurable polarization, but not high enough to cause a spark discharge across electrodes 10 and 11. It has been found that the potential of the capacitor or other source of potential employed to produce the desired instantaneous discharge should be chosen so that an initial current density of about 0.03 to 30 amps./cm.$^2$ is produced, although in some instances current densities outside this range may be used. Time required to effect this polarization effect may vary. When a capacitor is employed as the polarizing current source, current flows for only a fraction of a second. However, when a desired current source is connected directly to the electrodes, an expedient employed in a battery operated portable embodiment of this invention, the polarizing current may flow for about one second. Therefore the term "instantaneous" as applied to the time interval during which the polarizing current is impressed across the test electrodes is intended to connote the time lapse during which current is flowing from a suitable polarizing current source employed in this invention to produce the desired polarization of the electrodes. After the instantaneous discharge of current has been passed across electrodes 10 and 11, switch 39, which preferably is a spring-loaded push-button type of switch which will open when the forces applied to the switch to close it are removed, is opened permitting relay 34 to assume its normal position. This permits current to flow from the electrodes to the detecting section of the network, through contact 36 and pole 38 of relay 34. The variation in potential difference occurring during the depolarization of electrodes 10 and 11 product a D. C. signal which is applied to the A. C.-D. C. converter circuit containing the duo-triode thermionic vacuum tube 41 through vibrator 42. This arrangement is a conventional method for converting electrical energy existing as direct current and voltage into alternating current and voltage. Accordingly, other types of converters may be used, e. g. vibrator type generally employed in radio or similar circuits operated on low voltage direct current. The output from the converter circuit is amplified in a first stage of amplification which includes vacuum tube 43. Gain control 44 is connected in the plate circuit of the first stage amplifier and controls the transfer of the amplified output, which is sent to the second stage of amplification utilizing vacuum tube 45. Although the thermionic devices employed in these two stages of amplification are shown as separate units, a single duo-triode vacuum tube such as tube 41 should be employed to produce a nicety of design. The amplified signal, after leaving the second stage of amplification, is applied to the control grid of power amplifier tube 46. The current in plate circuit of this tube is rectified by a suitable means such as inductively coupled selenium rectifier 47 which permits the operation of D. C.-controlled relay 48. Other means for rectification can also be employed. When relay 48 is energized, contacts 49 and 50 are engaged. This completes the motor circuit which is supplied from the main source of current through point A as indicated. This relay closes when the plate current in the power amplification circuit reaches a certain value, for example, about 10 milliamperes. This relay is adjusted mechanically to open when the plate current in the power amplification circuit decreases to a certain value, for example, about 3.3 milliamperes. By operating all stages linearly, the relay performs the function of indicating the time interval between the interruption of the polarizing current, namely, the instantaneous discharge of current from condenser 33, and the time at which the polarization potential has diminished to a fixed fraction of its initial value. Although not as convenient and reliable as the A. C. conversion-amplification network above described, a conventional type D. C. amplification network may be employed as an alternate means for operating the relay 48 which controls the motor circuit. There are a number of disadvantages inherent in D. C. amplification circuits. Therefore, it is preferred that a suitable A. C. conversion-amplification network such as that used in the preferred embodiment be employed in the apparatus of this invention. Relay 48 operates timing motor 22 which, of course, will operate as long as relay 48 is energized. The period of time during which relay 48 is energized is directly related to the time required for the polarization potential difference to decrease to a predetermined fraction of the initial polarization potential difference induced in the test electrodes by means of the polarizing current applied from an external source hereinbefore mentioned. This predetermined fraction, which is called for simplicity "decay ratio," suitable for carrying out this invention may be from about 0.3–0.75. Timing motor 22 drives a variable resistance 52 by means of a suitable gear train. The resistance is made to vary linearly with time. A meter 53 and a source of direct current, such as battery 54 along with an adjustable resistance 55 which permit the adjustment of this circuit, comprise the indicating and metering circuit of the instrument. Meter 53 has a negligible resistance, therefore, a linear increase in resistance will cause a logarithmic decrease in current. Thus the meter scale is made to read in logarithmic units which are inversely proportional to time in linear units. The meter scale is suitably calibrated by reference to known corrosion rates. Thus this circuit functions as an analog computer to generate an empirical relationship between time and corrosion rate making the apparatus directly indicate corrosion rate. It is also within the scope of this invention to employ the timing motor to operate other types of analog computers for converting the logarithm of time required for the polarization potential, induced in the test electrodes by the instantaneous discharge of current, to decrease to a prescribed fraction of its initial value, into appropriate units of corrosion rate. In addition to electromechanical elements employing servo units, and other electrical elements, mechanical elements may be employed as function generators in the analog computer operated by timing motor 31. For example, an appropriately shaped cam rotated by motor 51 may operate a cam follower linked to a pointer which cooperates with a dial suitably calibrated in linear units of corrosion rate. In addition clock mechanisms cooperating with motor 51 can be made to operate a pointer which registers with a suitably calibrated dial to manifest corrosion rate in appropriate units. Other types of analog computer elements suitable for use in this invention may be operated, using as the operation factor the time duration of current flow in an electrical circuit controlled by relay 48 and the relation between voltages and currents in various electrical circuits. This type of computer will avoid the use of timing motor 51. For example, the function of time may be related to corrosion rate by using the current flow in the relay operated circuit to charge a suitable capacitor. The charged capacitor would then be discharged and the discharge potential measured by a suitable meter calibrated in convenient units of corrosion. Other suitable analog computer elements operating as function generators using the foregoing relationship will be apparent to those skilled in the art.

As mentioned above the voltage gain between the first and second stages of amplification is adjustable by means of gain control 44. This permits the apparatus to be adjusted for variations in salinity, conductivity, pH, etc. included in diverse corrodents. In some solutions, usually those having a low conductivity, the initial polarization might be as high as 1.4 volts. In other solutions, such as dilute acids, the initial polarization might be only 0.1 volt. The same corrosion rate relationship applies even in such varied corrosion media. It is, however, necessary to employ a means to amplify the initial voltage, whatever it might be, depending upon the characteristics of the corrosive media, to some fixed value at which relay 48 will become energized.

The network 56 which is connected to the rectifier 32 is a conventional filter which smoothens the D. C. surge produced by rectifier 32 to produce a steady D. C. which is applied as the plate voltage to amplifier tubes 43 and 45, and as screen grid potential to power amplier tube 46.

After the run has been made and the corrosion rate determined for a selected set of conditions, the meter continues to indicate the corrosion rate until the indicating and metering circuit is opened. This is effected by manually resetting this circuit by means of manual reset 25 which returns resistance 53 to its initial position.

Typical results obtained with the meter after calibration are given in Table I.

TABLE I

*Prediction of corrosion rate of steel in various solutions at room temperature by means of an automatic corrosion rate meter*

| No. | Solution | Corrosion Rate of Steel, mils penetration per year | |
|---|---|---|---|
| | | Meter Reading | Calculated from Actual Weight Loss |
| 1 | 10% Citric Acid+1% $CdSO_4$ | 20 | 23 |
| 2 | 50% ethylene glycol | 0.1 | 0 |
| 3 | 3% NaCl (standing) | [1] 22 | [1] 22 |
| 4 | 0.05% NaCl (aerated) | 8 | 5.6 |
| 5 | 8% NaCl (standing) | 13 | 11.8 |
| 6 | 18% NaCl (standing) | 6 | 6.2 |
| 7 | 1% $Na_2CrO_4$ | 0.1 | [1] 0 |
| 8 | Tap water (air sat'd) | 16 | 14.9 |

[1] Data used in calibrating the automatic corrosion rate meter.

In obtaining this data, the test electrodes were cold-rolled mild steel having an exposed area 2.5 sq. in. In Table I, the corrosion rate is tabulated in two columns, one column listing the reading obtained from the apparatus of this invention. The other column is for comparative purposes showing the corrosion rate determined by means of actual weight loss tests. A number of check runs were also made on various solutions to establish the accuracy and reproducibility of the automatic corrosion rate material of this invention. This data is included in Table II:

TABLE II

*Readings made with automatic corrosion rate meter in various solutions at room temperature*

| No. | Solution | Corrosion Rate, MPY [1] | Approx. MPY Expected from Experience |
|---|---|---|---|
| 1 | $H_2S$ in 4% NaCl | 30, 30, 30, 35 | abt. 35. |
| 2 | Dil. HCl, pH=2 | 18, 19, 18, 16 | abt. 20. |
| 3 | 1% $Na_2S \cdot 9H_2O$ | 1, 0.1, 0.5, 0.5 | pract. 0. |
| 4 | 5% $FeCl_3$ | 35, 35, 35 | 35. |
| 5 | Distilled $H_2O$ | 7, 8, 8, 8.5 | abt. 10. |
| 6 | Dil. Acetic acid, abt. 5% | 12, 11, 13, 13, 14.5 | abt. 20. |
| 7 | Conc. $CaCl_2$ brine | 3, 1, 3 | 1. |

[1] Results of successive runs made at half hour intervals.

From the data listed in Table I and II, it is seen that the instrument provides reproductive and accurate information on corrosion rate. The apparatus is especially adaptable to field use where it is generally sufficient to know the related order of magnitude of the corrosion rate, for example, whether it is closer to 0.1, 1, or 10 thousandths of an inch penetration per year.

The apparatus of this invention has several novel features: (1) The instrument requires only a few minutes to operate. Operation is simple in that it is only necessary to connect the apparatus to the test electrodes and close a switch to make a direct reading corrosion rate measurement. The meter scale is direct reading and can be calibrated in any desired unit of corrosion rate such as mils penetration per year, inches of penetration per year, pounds of steel per sq. ft. per month, milligrams of steel per square decimeter per day, etc.

Another feature is that the apparatus employs two electrodes which can be fitted permanently into a pipe line or vessel for determination of the corrosion rate of that vessel. In this connection, the electrodes employed will normally be grounded to the pipe and vessel being examined for corrosion. For the brief period in which the test is made, the electrodes may be isolated from the vessel. Thus the electrodes will be eventually, part of the vessel and will indicate the corrosion behavior thereof. A coating of rust or other corrosion products on the electrode will not affect the accuracy of the instrument. The instrument has particular application for use in testing the corrosion of metallic conduits employed in oil, gas, or water wells, as well as the metallic flow lines and surface equipment appurtenant to these wells. By means of permanently installed electrodes, it is possible to determine the effectiveness of corrosion inhibitors employed to retard the corrosion in these metallic containers. In order to employ a meter in this service, it is only necessary to convert the above described instrument from an alternating current-operated apparatus to a battery-operated portable unit. Any changes in the foregoing apparatus necessary for this conversion will be obvious to those persons skilled in this art and are considered within the scope of this invention.

The automatic corrosion rate meter of this invention has application in other aqueous systems such as refrigeration brine pipe, steam condensate lines, certain process industry and oil refinery units. Flexibility of operation in a wide variety of electrolytic environments producing diverse polarization effects is permitted by means of the instant invention which measures corrosion rate regardless of the magnitude of the initial polarization potential or the variations in time required for the electrodes to depolarize to a predetermined fraction of the initial polarization potential.

What is claimed is:

1. An apparatus for rapidly and automatically determining the rate of corrosion of a metallic material of construction which comprises a pair of electrodes fabricated from said material of construction and adapted to be immersed in an aqueous corrodent, a means for passing an instantaneous discharge of a polarizing direct current in an amount sufficient to induce the polarization of said electrodes, and produce a polarization potential difference between said electrodes, a switch means for transferring and discharging said potential difference to a detecting network, said detecting network comprising an amplifier circuit electrically interconnected to said electrodes to amplify the polarization potential difference exhibited by said electrodes, a control circuit receiving the output from said amplifier circuit, an electromagnetic device serially disposed in said control circuit and operated by variations in current flow in said electrical circuit, a metering circuit containing a serially connected electrical switch means operated by said electromagnetic device, a power source whereby said circuits are energized, and an analog computer function generator operated by the current flow in said metering circuit to convert the lapse of time during which current flows in said metering circuit into units of corrosion rate.

2. An apparatus for rapidly and automatically determining the rate of corrosion of a metallic material of construction which comprises a pair of electrodes fabricated from said material of construction and adapted to be immersed in an aqueous corrodent, a means for passing an instantaneous discharge of a polarizing direct current in an amount sufficient to induce the polarization of said electrodes, and produce a polarization potential difference between said electrodes, a switch means for transferring and discharging said potential difference to a detecting network, said switch means being adapted to disconnect said detecting network from said electrodes during the polarization thereof, said detecting network comprising an A. C.-D. C. converter electrically connected to said electrodes to convert the said polarization potential difference into an electrical signal having alternating current characteristics, an amplifier circuit to amplify said signal, a power amplifier comprising a thermionic vacuum tube having at least a cathode, a control grid, and a plate, interconnected in a plate circuit, said amplified signal being impressed on said control grid to control the flow of current in said plate circuit, a control circuit containing a means for rectifying the output of said power amplifier to produce an amplified signal having D. C. characteristics in said control circuit, an electromagnetic device serially disposed in said control circuit and operated by variations in current flow in said control circuit, a metering circuit containing a serially connected electrical switch means operated by said electromagnetic device; a power source whereby said circuits are energized; and an analog computer function generator operated by the current flow in said metering circuit to convert the lapse of time during which current flows in said metering circuit into units of corrosion rate.

3. An apparatus in accordance with claim 2 in which the means for passing the instantaneous discharge of polarizing current through said electrodes is a capacitor adapted to be charged by means of an external source of direct current.

4. An apparatus in accordance with claim 2 in which the amplifier circuit comprises a two-stage amplifier in which the first amplification stage is connected to the second amplification stage through a gain control means.

5. An apparatus for rapidly and automatically determining the rate of corrosion of a metallic material of construction which comprises a pair of electrodes fabricated from said material of construction and adapted to be immersed in an aqueous corrodent, a means for passing an instantaneous discharge of a polarizing direct current in an amount sufficient to induce the polarization of said electrodes, and produce a polarization potential difference between said electrodes, a switch means for transferring and discharging said potential difference to a detecting network, said network comprising an amplifier circuit which comprises a two stage amplifier in which the first amplification stage is connected to the second amplification stage through a gain control means, a power amplifier comprising a thermionic vacuum tube having at least a cathode, a control grid, and a plate interconnected in a plate circuit, said amplified signal being impressed on said control grid to control the flow of current in said plate circuit, a control circuit containing a means for rectifying the output of said power amplifier to produce an amplified signal having D. C. characteristics in said control circuit, an electromagnetic device serially disposed in said control circuit and operated by variations in current flow in said control circuit, a motor control circuit containing a serially connected switch means operated by said electromagnetic device, a power source, and a timing motor, and an analog computer function generator which comprises an electric circuit having serially connected therein a D. C. source of power, a variable resistance, and an ammeter, said variable resistance being mechanically linked to said timing motor and operated thereby.

6. An apparatus in accordance with claim 5 in which said means for rectifying the output of said power amplifier is a selenium rectifier system inductively coupled to the plate circuit of said power amplifier.

7. An apparatus in accordance with claim 6 in which the means for passinng the instantaneous discharge of polarizing current through said electrodes is a capacitor adapted to be charged by means of an external source of direct current.

8. An apparatus in accordance with claim 7 in which the electromagnetic device is energized for a period of time for the initial polarization potential difference induced in said electrodes to decrease to about 30%-75% of the initial potential.

References Cited in the file of this patent

UNITED STATES PATENTS

| | | |
|---|---|---|
| 2,232,211 | Cary | Feb. 18, 1941 |
| 2,344,672 | Blasier | Mar. 21, 1944 |
| 2,367,746 | Williams | Jan. 23, 1945 |
| 2,374,088 | Fontana et al. | Apr. 17, 1945 |